(12) United States Patent
Nielsen et al.

(10) Patent No.: US 6,267,189 B1
(45) Date of Patent: Jul. 31, 2001

(54) POWER TAKE-OFF ENGAGEMENT CONTROL SYSTEM

(75) Inventors: Bradley A. Nielsen, Lisle; Craig R. Eike, DeKalb, both of IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/262,713

(22) Filed: Mar. 4, 1999

(51) Int. Cl.[7] .................................................. B60K 17/28
(52) U.S. Cl. .................... 180/53.1; 192/12 C; 192/103 F
(58) Field of Search ................................. 192/12 C, 56 F, 192/103 F, 109 F; 74/11, 15.2; 180/53.1; 477/171, 172, 175, 176, 177

(56) References Cited

U.S. PATENT DOCUMENTS

| | | | |
|---|---|---|---|
| Re. 34,023 | * 8/1992 | Weis et al. ............................ | 74/15.86 |
| 4,760,902 | * 8/1988 | Bellanger ............................ | 192/0.033 |
| 5,299,129 | * 3/1994 | Uchida et al. ....................... | 364/424.1 |
| 5,494,142 | 2/1996 | Kale . | |
| 5,549,185 | * 8/1996 | Kale .................................... | 192/12 C |
| 5,806,640 | * 9/1998 | Kale .................................... | 192/12 C |
| 6,055,477 | 4/2000 | McBurney et al. ................... | 701/207 |
| 6,080,081 | * 6/2000 | Sauermann et al. .................... | 477/79 |

* cited by examiner

Primary Examiner—J. J. Swann
Assistant Examiner—James S. McClellan
(74) Attorney, Agent, or Firm—Foley & Lardner (57) ABSTRACT

An apparatus and method is disclosed for controlling engagement of a power take-off shaft (PTO) on a vehicle. The apparatus includes a clutch including an input shaft coupled to a power source and an output shaft coupled to the PTO. The apparatus also includes an input speed sensor for sensing a quantity related to the angular velocity of the input shaft, an output shaft speed sensor for sensing angular velocity of the output shaft, and a clutch controller for adjusting pressure of hydraulic fluid applied to the clutch in response to control signals. Torque transmitted between the input and output shafts is responsive to the control signals. The apparatus also includes a control circuit coupled to the speed sensors and the clutch controller. The control circuit is configured to receive signals from the speed sensors and to provide the control signals in response thereto. During engagement of the PTO, the control circuit continuously determines an actual acceleration of the PTO based upon the output shaft velocity, and generates the control signals using a desired acceleration and the actual acceleration. The control circuit may continuously determine the desired acceleration based upon the input speed signal. Alternatively, the control circuit may provide control signals to cause the torque transmitted through the clutch to increase at a rate depending upon the difference between the desired and actual accelerations when the actual acceleration is more than a threshold proportion of the desired acceleration, and to cause the torque to increase at a rate independent of the difference when the actual acceleration is less than the threshold proportion.

9 Claims, 8 Drawing Sheets

POWER TAKE-OFF ENGAGEMENT CONTROL SYSTEM

FIELD OF THE INVENTION

The present invention relates to a control system for engagement of a power take off (PTO) for an agricultural vehicle such as a tractor. In particular, the present invention relates to a control system for controlling the engagement of a PTO in which the control system continuously determines (i.e., recalculates) a desired acceleration rate of the PTO. Also, the present invention relates to a control system for controlling the engagement of a PTO which provides a clutch with commands to transmit different amounts of torque depending upon the difference between an actual acceleration rate of the PTO and the desired acceleration rate of the PTO, and which provides a command to transmit a low amount of torque when the difference between the actual and desired acceleration rates is large enough to indicate that the clutch is not yet engaged.

BACKGROUND OF THE INVENTION

PTO shafts (or simply "PTOs") are used on agricultural vehicles such as tractors to provide power for equipment or implements such as combines, mowers and spreaders. As the use of PTOs developed, most tractor manufacturers standardized on 1000 RPM and 540 RPM PTOs. This standardization involved the use of a common size shaft and spline arrangement for each RPM rating. When the shaft sizes were standardized years ago, tractors had relatively low horsepower (e.g., 30 to 50 horsepower). Accordingly, the torque output of a PTO was limited by the horsepower of the tractor. Modern tractors commonly have horsepower ratings in excess of 100 horsepower. However, the shaft sizes for PTOs have not changed due to the need to maintain compatibility with older equipment and maintain the standardization for PTOs. Thus, the torque output of PTOs for many modern tractors is no longer limited by the tractor horsepower. Rather, the torque output is limited by the strength of the PTO and the failure thereof. For very high horsepower tractors (e.g., over 130 horsepower), manufacturers have eliminated the 540 RPM PTO. Due to the gear reduction required to achieve a PTO speed of 540 RPM at engine idle, the very high horsepower tractors can apply a torque to the 540 RPM PTO in excess of that required for the PTO toil. In addition to causing PTO failures, the torque produced by the higher horsepower tractors also can accelerate equipment attached to the respective PTO at a rate which can damage the equipment.

Figure 1:
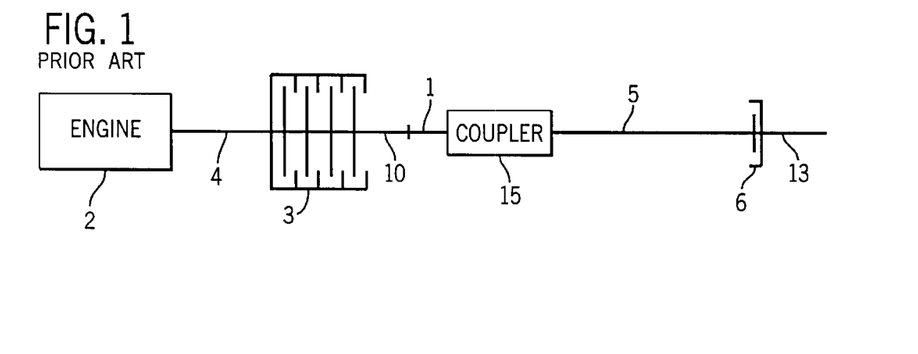
FIG. 1 is a schematic block diagram of an exemplary arrangement for transmitting power from an engine of an agricultural vehicle to a PTO of the agricultural vehicle.
Figure 2:
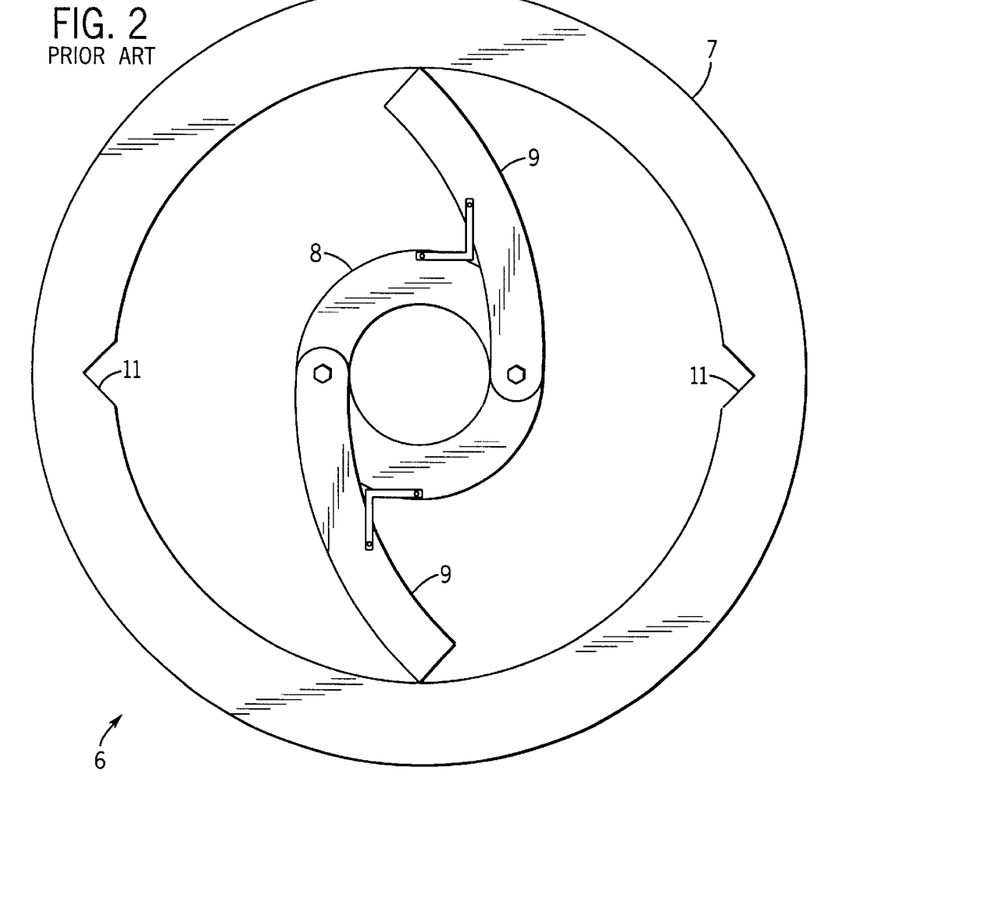
FIG. 2 is a rear elevation view of a conventional overrunning clutch.

Excessive acceleration of (or application of torques to) a PTO is of particular concern during the process of engagement of the PTO from a standstill or zero angular velocity state to a "lock-up" state, at which the PTO has an angular velocity equaling that of the engine (or, assuming various gear reductions, etc., an angular velocity that is an appropriate fraction or multiple of the angular velocity of the engine). Relevant components associated with this process of engagement of a PTO are shown in FIGS. 1 and 2 (prior art). FIG. 1 shows, in simplified form, a conventional (exemplary) arrangement for transmitting power from an engine 2 (of an agricultural vehicle) to a PTO 1. As shown, PTO 1 is capable of receiving power from engine 2 by way of a PTO clutch 3. PTO clutch 3 is capable of transmitting power from an input shaft 4, which receives power from engine 2, to an output shaft 10, which is in turn typically coupled to PTO 1 by way of one or more gears (not shown). The amount of power transmitted from engine 2 to PTO 1 depends upon whether PTO clutch 3 is engaged (i.e., whether plates within the clutch have been compressed sufficiently to allow the clutch to transmit torque) and, once the clutch has been engaged, upon the degree of hydraulic fluid pressure applied to the clutch, which determines the amount of torque that the clutch may transmit from input shaft 4 to the PTO via output shaft 10.

PTO 1 may be coupled, by way of a coupler 15, to an implement input shaft 5 (supported by an implement attached to the agricultural vehicle). Typically, implement input shaft 5, which is for receiving power from PTO 1, is in turn coupled to an implement output shaft 13 for transmitting the power to attached equipment supported by the implement. In certain embodiments, implement input shaft 5 may be coupled to implement output shaft 13 by way of an over-running clutch 6. Over-running clutch 6 allows implement input shaft 5 (and PTO 1) to transmit power to implement output shaft 13 but also allows the output shaft to continue to rotate freely when the input shaft no longer is rotating. As shown in FIG. 2, an exemplary over-running clutch 6 includes an arrangement in which an output 7 attached to output shaft 13 concentrically surrounds an input 8 attached to input shaft 5. Input 8 transmits power to output 7 only when spring-actuated locking pins 9 are fully extended into two locking grooves or notches 11 and when input 8 receives power (from PTO 1) causing the input to rotate in a counter-clockwise direction relative to output 7, in which case the input is coupled to the output. In other circumstances, such as when locking pins 9 are not fully extended into locking notches 11 (as shown), or when output 7 rotates in a counter-clockwise direction relative to input 8 (e.g., when no power is being transmitted from engine 2 but when output shaft 13 nonetheless is rotating in a counter-clockwise direction), output 7 freely rotates with respect to input 8 and effectively no power is transmitted between the two elements.

Figure 3A:
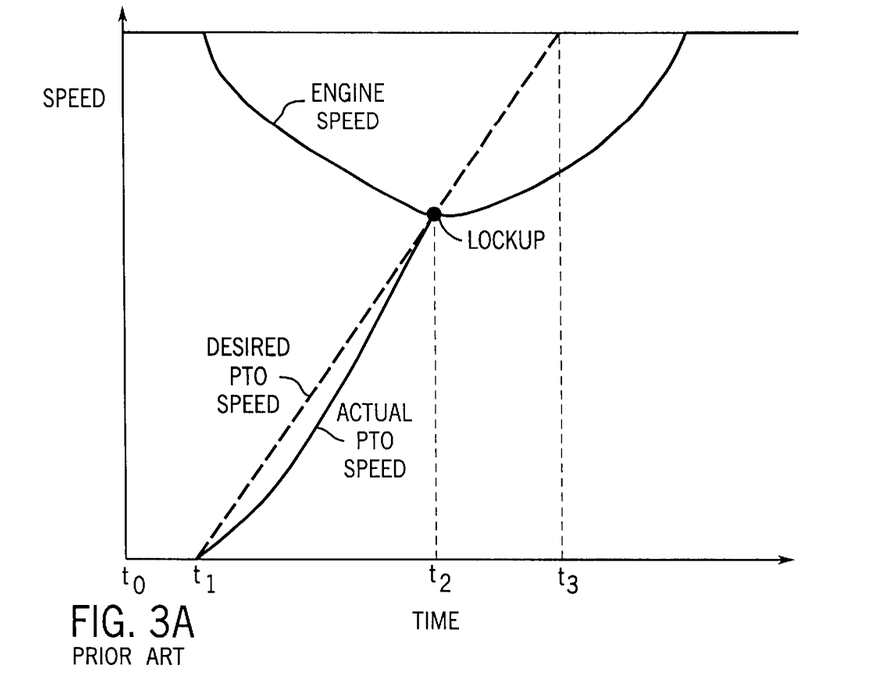
FIG. 3A is a graphical representation of the actual and desired speeds of a PTO and engine speed of an agricultural vehicle during engagement of the PTO.

As shown in prior art FIG. 3A, PTO 1 experiences a rapid change in angular velocity during the PTO engagement process once PTO clutch 3 has been engaged such that power is transmitted from engine 2 to the PTO (e.g., after a time $t_1$). In order to control PTO acceleration during this process of engagement of PTO 1, Case Corporation has developed a PTO clutch control system that monitors the angular velocities of input shaft 4 and output shaft 10 and controls the acceleration of PTO 1 based upon these measured velocities, as described in U.S. Pat. No. 5,494,142 to Kale and incorporated by reference herein. Based upon the monitored speeds of input shaft 4 and output shaft 10, the clutch control system calculates a desired acceleration for PTO 1 and also repeatedly calculates an actual acceleration of the PTO. The desired acceleration is calculated as the ratio of the angular velocity of input shaft 4 (or a quantity directly related to the engine speed of the agricultural vehicle) to a predetermined amount of time (shown in FIG. 3A as the time interval between a time $t_3$ and a time $t_1$), and is only calculated once. That is, only one calculated value of the desired acceleration is utilized by the clutch control system throughout the PTO engagement process. The actual acceleration is calculated as the ratio of the change in angular velocity of output shaft 10 (or a quantity related to the speed of PTO 1) during a particular time interval (the time between two velocity measurements) divided by the time interval. The predetermined amount of time with respect to the desired acceleration (the time interval between times $t_3$ and $t_1$) is chosen to restrict the desired acceleration to a low enough level so that, if PTO 1 actually accelerated at that rate, no damage to the PTO or to attached equipment would occur. For example, the predetermined amount of time may be 2 seconds. Depending upon whether the desired acceleration exceeds or is less than the actual acceleration at a given time, the clutch control system causes PTO clutch 3 to transmit, respectively, more or the same torque such that the actual acceleration approaches the desired acceleration.

FIG. 3A shows the time variation during the PTO engagement process of the actual and desired speeds of PTO 1 and the actual speed of engine 2 (or a fraction or multiple thereof, to account for gear reductions or augmentations occurring between engine 2 and PTO 1), and thereby illustrates a typical PTO acceleration (engagement) pattern using the above-referenced PTO clutch control system. From an initial time $t_0$ until a time $t_1$, PTO clutch 3 is not yet engaged and is providing no torque and so the actual speed of PTO 1 remains zero. After time $t_1$, PTO clutch 3 is engaged; that is, the plates of the clutch have been sufficiently compressed so that the torque transmitted by the clutch is effectively proportional to the hydraulic fluid pressure applied to the clutch. Consequently, PTO 1 begins to receive torque through PTO clutch 3 from engine 2 in proportion to hydraulic fluid pressure controlled by the PTO clutch control system and begins to accelerate, as shown by the actual PTO speed curve. FIG. 3A also shows a desired PTO speed curve that has a constant slope reflecting the constant desired acceleration that would be necessary to cause PTO 1 to attain the measured initial speed of engine 2 (or the appropriate fraction or multiple thereof) within the predetermined amount of time (the time interval between times $t_3$ and $t_1$). As shown, the actual PTO speed typically lags the speed that would have occurred if PTO 1 consistently accelerated at the desired acceleration. However, though the actual acceleration of PTO 1 typically lags behind the desired acceleration of the PTO, it may exceed the desired acceleration as well. Throughout the process, the PTO clutch control system recalculates the actual acceleration of PTO 1 and adjusts the torque transmitted by PTO clutch 3 so that the actual acceleration approaches the desired acceleration.

Although the PTO clutch control system does allow for a controlled acceleration of PTO 1, the system inaccurately presumes that the speed of engine 2 remains constant during the PTO engagement process and therefore that a single measured angular velocity of input shaft 4 is an accurate basis upon which to calculate the desired acceleration. As shown in FIG. 3A, in practice this assumption is incorrect since the speed of engine 2 (and input shaft 4) typically droops as torque is transmitted by PTO clutch 3 from input shaft 4 to output shaft 10 (and then to PTO 1). That is, the speed to which output shaft 10 must accelerate in order to reach the speed of input shaft 4 is reduced. Assuming that the actual acceleration of PTO 1 is within a reasonable proximity of the desired acceleration, the time required for the PTO to reach the engine speed (or appropriate fraction or multiple thereof) therefore is reduced from the predetermined time used to calculate the desired acceleration (the time interval between times $t_3$ and $t_1$) to a shortened time, the time interval between a time $t_2$ and time $t_1$. Consequently, the acceleration and associated stress experienced by PTO 1 is larger than is necessary to accelerate the PTO to the engine speed (or appropriate fraction or multiple thereof) by predetermined time $t_3$. It should be noted that the actual acceleration of PTO 1 is directly related to the magnitude of droop in engine speed and so, as one increases the desired and actual accelerations, one produces greater engine speed droop and exacerbates the above-described problems.

The above-described PTO clutch control system distinguishes between and responds to only two operational conditions (i.e., whether the actual acceleration exceeds or is less than a given desired acceleration). However, the control system may be modified to include a proportional adjustment algorithm wherein the degree of adjustment of the torque transmitted by PTO clutch 3 depends upon the degree by which the desired acceleration exceeds the actual acceleration. For example, the proportional adjustment algorithm may distinguish among three different levels of difference by which the desired acceleration may exceed the actual acceleration: if the actual acceleration of PTO 1 is less than the desired acceleration but greater than two-thirds of the desired acceleration, the control system increases the torque transmitted by PTO clutch 3 at a slow rate; if the actual acceleration is less than two-thirds of the desired acceleration but greater than one-third of the desired acceleration, the control system increases the torque transmitted at a medium rate; and if the actual acceleration is less than one-third of the desired acceleration, the control system increases the torque transmitted at a fast rate. Thus, the proportional adjustment algorithm causes the actual acceleration to approach the desired acceleration at a faster rate as the difference by which the desired acceleration exceeds the actual acceleration increases. As with the unmodified PTO clutch control system without the proportional adjustment algorithm, the modified PTO clutch control system may be configured to maintain the torque transmitted by PTO clutch 3 at a constant level if the actual acceleration exceeds the desired acceleration.

Although use of this modified PTO clutch control system provides for a more nuanced response to differences between the desired and actual accelerations, such use may also cause a second undesirable stress on PTO 1 (or attached equipment) when operating in conjunction with over-running clutch 6 as a result of non-ideal operation of PTO clutch 3, as described below. As described above, over-running clutch 6 only transmits power from input 8 to output 7 when locking pins 9 are engaged with locking notches 11. It is frequently the case that, before engagement of PTO 1, locking pins 9 are not engaged with locking notches 11 and, instead, input 8 is oriented relative to output 7 such that, for the locking pins to engage the locking notches, the input must rotate counter-clockwise a portion of a revolution with respect to the output. This is particularly the case since implement output shaft 13 may have rotated due to spurious movement of the attached equipment while PTO clutch 3 was disengaged (e.g., certain types of attached equipment may rotate due to contact with the ground as the agricultural vehicle and implement move forward, even though no power is being transmitted from engine 2 to the equipment via PTO 1). Also, locking pins 9 may disengage from locking notches 11 even when engine 2 is delivering power through PTO clutch 3 in circumstances where implement output shaft 13 (and the attached equipment) begins rotating at a rate that is faster than the rotational rate of PTO 1 (e.g., where engine speed is reduced). In either of these situations, it is possible for PTO 1 to receive power from engine 2 via PTO clutch 3 and to rotate (such that input 8 rotates counter-clockwise with respect to output 7) for a short period of time without transmitting any power to implement output shaft 13. This is because PTO 1 (and implement input shaft 5) must first rotate a portion of a revolution so that locking pins 9 engage locking notches 11 before implement input shaft 5 engages implement output shaft 13 through over-running clutch 6. In other words, there may be a "locking delay" in the response of implement output shaft 13 to power transmitted from engine 2 due to over-running clutch 6.

While the locking delay is of little concern at those times when PTO clutch 3 is engaged, the locking delay is problematic during engagement of PTO 1 as controlled by the modified PTO clutch control system. As described above, PTO clutch 3 is modeled as ideally having two distinct operational states, (a) a first, disengaged state in which the plates of the clutch are not compressed and so the clutch does not transmit torque between input shaft 4 and output shaft 10 (and then to PTO 1), and (b) a second, engaged state in which the plates of the clutch are compressed and the clutch transmits torque in an amount approximately directly related to the hydraulic fluid pressure applied to the clutch. However, in practice, PTO clutch 3 may still transmit a small but not negligible amount of torque from input shaft 4 to output shaft 10 even during the first, disengaged state, particularly if the hydraulic fluid pressure within the clutch is being increased to compress the plates and to cause the clutch to enter the engaged state. Even though this small amount of torque is typically insufficient to rotate implement output shaft 13 if the shaft is attached to equipment, the torque may be sufficient to rotate PTO 1 while locking pins 9 of over-running clutch 6 are disengaged from locking notches 11 and until such time as output 7 locks to input 8 (that is, the torque may be sufficient to rotate the PTO during the locking delay). To summarize, PTO clutch 3 may transmit enough torque from input shaft 4 to PTO 1 during the PTO engagement process, before the clutch is engaged, that the PTO will rotate from a position in which locking pins 9 of over-running clutch 6 are disengaged from locking notches 11 to the position in which the locking pins are engaged with the locking notches.

Figure 3B:
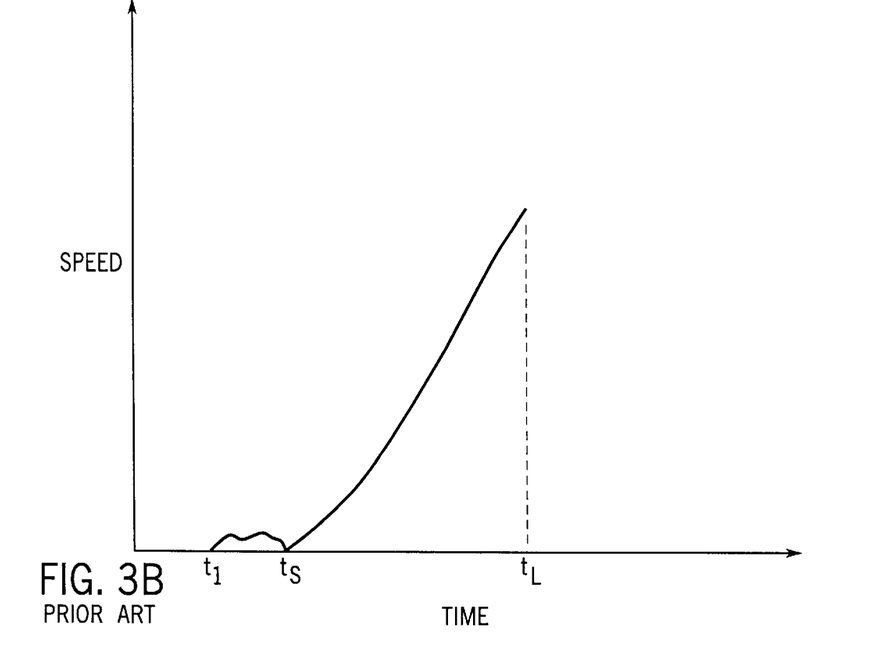
FIG. 3B is a graphical representation of the actual speed of a PTO of an agricultural vehicle during engagement of the PTO both before and after a clutch for engaging the PTO is engaged.

This rotation of PTO 1 before engagement of PTO clutch 3 results in undesirable consequences given the design of the modified PTO clutch control system, as shown in FIG. 3B (prior art). As described in U.S. Pat. No. 5,494,142, the PTO engagement process effectively begins when a PTO on/off switch (not shown) is closed by the operator of the agricultural vehicle. After that time, the PTO clutch control system (whether modified or unmodified) determines whether PTO 1 (i.e., output shaft 10) is rotating as an indication of whether PTO clutch 3 is engaged. Once PTO 1 is determined to be rotating, the PTO clutch control system (whether modified or unmodified) then begins to compare desired and actual accelerations, and begins to adjust the hydraulic fluid pressure applied to PTO clutch 3 in response to differences between the desired and actual accelerations in order to accelerate the PTO. While the design of the PTO clutch control system presumes that PTO rotation is a good indication of engagement of PTO clutch 3, as discussed above PTO 1 may begin to rotate before the clutch is engaged so long as the clutch transmits some torque and locking pins 9 of over-running clutch 6 are not engaged with locking notches 11. As shown in FIG. 3B, PTO 1 may have a nonzero speed between times $t_1$ and $t_s$, at which time PTO clutch 3 is engaged and controlled acceleration of PTO 1 begins, continuing until some later time, $t_L$. Nevertheless, under these conditions the PTO clutch control system still senses the PTO rotation (between times $t_1$ and $t_s$) and consequently begins to compare the desired and actual accelerations and to adjust the hydraulic fluid pressure applied to PTO clutch 3. Because the actual torque transmitted to PTO 1 prior to the engagement of PTO clutch 3 is small (and, in any case, the PTO stops rotating upon the engagement of locking pins 9 and locking notches 11 of over-running clutch 6), the difference between the desired and actual accelerations immediately becomes large. The modified PTO clutch control system responds to this large differential (i.e., a differential in which the actual acceleration is less than one third of the desired acceleration) by increasing the hydraulic fluid pressure applied to PTO clutch 3 at a fast rate. Consequently, once PTO clutch 3 is engaged, PTO 1, implement input and output shafts 5 and 13, and any attached equipment immediately experience rapidly increasing torque and rapid acceleration along with related, undesirable stresses. (In contrast, the unmodified PTO clutch control system would respond to this large differential by slowly increasing the hydraulic fluid pressure applied to PTO clutch 3, thereby slowly increasing the torque transmitted by the clutch, and PTO 1 would not experience the extreme acceleration or overshoot in the valve command.) This effect may be exacerbated if, as in some systems, the fast rate of increase command for the hydraulic fluid pressure is faster than the hydraulics response time. If this occurs, the system may determine that the hydraulic fluid pressure should be increased even faster, and so the resulting command to increase the hydraulic fluid pressure may overshoot the optimum value and produce excessive acceleration of PTO 1.

It should be noted that, while the above situation involving over-running clutch 6 is the most common example of a circumstance in which spurious torque communicated through PTO clutch 3 may cause the modified PTO clutch control system to inappropriately increase hydraulic fluid pressure, this is not the only such circumstance. Any circumstance in which PTO 1 may begin rotation in response to spurious torque communicated through PTO clutch 3 when still not engaged may result in the same inappropriate responses.

Accordingly, it would be advantageous to develop an improvement for existing PTO clutch control systems that would enable the systems to control the engagement of a PTO so that the PTO would accelerate to attain the speed (or a multiple or proportion of the speed, depending upon gear reduction) of an engine both within and in not substantially less than a predetermined amount of time despite engine droop due to engagement of the PTO. It would also be advantageous to develop an improvement to the modified PTO clutch control system (as such system is described above) whereby the control system would avoid producing excessive acceleration of a PTO during PTO engagement even though (a) a PTO clutch acted in a non-ideal fashion to transmit torque before the clutch was engaged, (b) the PTO rotated in response to the transmitted torque until the locking pins of an over-running clutch engaged the locking notches of the over-running clutch, (c) the PTO clutch control system sensed the PTO rotation, and (d) the PTO clutch control system consequently began to compare desired and actual accelerations of the PTO and adjust torque transmission by the PTO clutch in response to the differential between those accelerations. It would further be advantageous if these improvements to the existing PTO clutch control systems could be implemented by making only minor changes to the existing PTO clutch control systems.

SUMMARY OF THE INVENTION

The present invention relates to an apparatus for controlling engagement of a power take-off shaft (PTO) on a vehicle with a power source, where the PTO is for supplying rotational motion from the vehicle to a piece of equipment other than the vehicle. The apparatus includes a clutch with an input shaft coupled to the power source and an output shaft coupled to the PTO. The clutch includes a plurality of plates operable to translate through a distance during engagement of the clutch and, upon engagement of the clutch, controllably transmits torque between the input and output shafts. The apparatus further includes an input speed sensor for sensing a quantity related to the angular velocity of the input shaft and providing an input speed signal representative thereof, and an output shaft speed sensor for sensing angular velocity of the output shaft and providing an output shaft speed signal representative thereof. The apparatus also includes an electromechanical clutch controller coupled to the clutch for adjusting pressure of a hydraulic fluid applied to the clutch in response to control signals during engagement of the PTO, and torque transmitted between the input and output shafts is responsive to the control signals. The apparatus further includes a control circuit coupled to the input and output shaft speed sensors and the clutch controller. The control circuit receives the input and output shaft speed signals and provides the control signals in response thereto. During engagement of the PTO, the control circuit continuously determines an actual acceleration of the PTO based upon the sensed angular velocity of the output shaft. Based upon a desired acceleration and the actual acceleration, the control circuit generates the control signals.

The control circuit continuously determines the desired acceleration of the PTO based upon the input speed signal. The control circuit also provides control signals to cause the torque transmitted through the clutch to increase at a rate depending upon the difference between the desired and actual accelerations when the actual acceleration is more than a threshold proportion of the desired acceleration, and to cause the torque to increase at a rate independent of the difference when the actual acceleration is less than the threshold proportion of the desired acceleration.

The present invention further relates to a method of controlling engagement of a power take-off shaft (PTO) on a vehicle having a power source, the PTO supplying rotational motion to a piece of equipment other than the vehicle. The method includes sensing a quantity related to the angular velocity of an input shaft of a clutch at an input speed sensor, sensing angular velocity of an output shaft of the clutch at an output shaft speed sensor, providing an input speed signal representative of the sensed quantity related to the angular velocity of the input shaft and providing an output shaft speed signal representative of the sensed angular velocity of the output shaft. The method also includes receiving the input and output shaft speed signals at a control circuit, continuously determining an actual acceleration of the PTO based upon the output shaft speed signal and generating control signals using a desired acceleration and the actual acceleration. The method further includes adjusting operation of the clutch in response to the control signals during engagement of the PTO, with torque being controllably transmitted between the input and output shafts when the clutch is engaged.

The method further includes continuously determining the desired acceleration of the PTO based upon the input speed signal. The control signals generated based upon the desired and actual accelerations may be control signals that, when the clutch is engaged, cause the torque transmitted through the clutch to increase at a rate depending upon the difference between the desired and actual accelerations when the actual acceleration is more than a threshold proportion of the desired acceleration, and cause the torque to increase at a rate independent of the difference when the actual acceleration is less than the threshold proportion of the desired acceleration.

DETAILED DESCRIPTION OF THE PREFERRED EMBODIMENT

Figure 4:
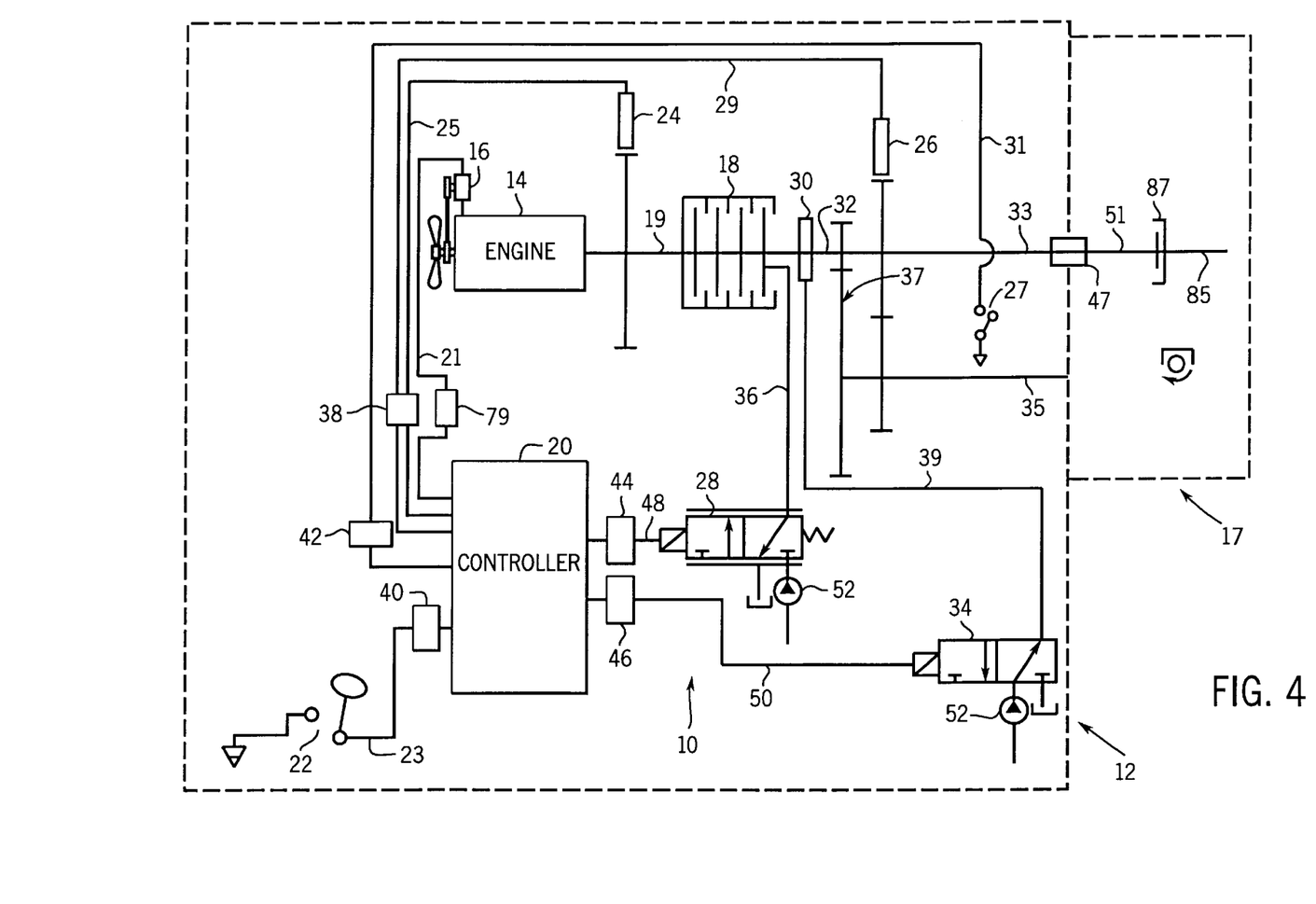
FIG. 4 is a schematic block diagram of a PTO clutch control system on an agricultural vehicle.

Referring to FIG. 4., a PTO clutch control system 10 for an agricultural vehicle 12 such as a tractor is shown. With the exception of PTO clutch control system 10, tractor 12 may be a conventional agricultural tractor of the type including an engine 14 having conventional accessories such as an alternator 16. Engine 14 is the power source for tractor 12 and, in addition to providing power to the drive wheels (not shown) of tractor 12, provides the power to apply rotational motion to a multi-plate, hydraulically-actuated PTO clutch 18. Depending upon whether PTO clutch 18 is engaged, power from engine 14 may in turn be transmitted to an output shaft 32. Output shaft 32 is shown directly coupled to a 1000 RPM PTO (high speed PTO) 33 and also is shown coupled to a 540 RPM PTO (low speed PTO) 35 by a reduction gear 37. In alternative embodiments, high speed PTO 33 may be of another speed rating such as 750 RPM. While in alternate embodiments, high and low speed PTOs 33,35 may be provided at separate output terminals on tractor 12, preferably each PTO may be employed at a single output terminal (one PTO may be substituted for the other).

Control system 10 includes a controller 20 (including, e.g., a digital microprocessor such as the Intel TN83C51FA), a PTO on/off switch 22, an output shaft transducer 26 for providing a signal representing the speed of output shaft 32 to the controller, a PTO status switch 27, and a normally-closed, solenoid-operated, hydraulic, proportional clutch control valve 28. Control system 10 also is coupled to alternator 16 and receives a signal therefrom representing the speed of engine 14. The engine speed is equal to or, depending upon gear reduction, a multiple or proportion of the speed of an input shaft 19 to PTO clutch 18 that receives power from engine 14 and transmits power to the clutch. In alternate embodiments, a signal representative of the speed of input shaft 19 (that is directly representative of the speed of engine 14) may be obtained by way of an input shaft transducer 24 coupled to shaft 19 instead of alternator 16. By way of example, transducers 24 and 26 may be variable reluctance sensors. While status switch 27 is used to provide information as to whether high speed PTO 33 or low speed PTO 35 is being employed, in alternate embodiments a speed sensor (not shown) may instead be employed to provide such information. (In embodiments where tractor 12 has two separate output terminals for the two types of PTOs, a status switch or speed sensor is not required.)

In addition to controlling PTO clutch 18, control system 10 may control a hydraulic brake 30 which inhibits rotational motion of output shaft 32 when PTO clutch 18 is not fully engaged. Although brake 30 inhibits rotational motion of output shaft 32 when PTO clutch 18 is not fully engaged, the output shaft may nevertheless sometimes rotate in response to torque transmitted by the clutch even when not fully engaged. Control system 10 includes a hydraulic valve 34 connected to brake 30 by a hydraulic conduit 39. Valve 34 engages and disengages brake 30. Brake 30 is biased to inhibit rotation of output shaft 32. Accordingly, valve 34 is normally closed, and opened when brake 30 is to be released. Depending upon the application and the configuration of valve 28 and a hydraulic conduit 36 which connects valve 28 to PTO clutch 18, valve 34 may be eliminated by connecting brake 30 directly to conduit 36. Accordingly, as valve 28 applied pressurized hydraulic fluid to engage PTO clutch 18, the pressurized fluid would also release brake 30. By configuring conduits 36 and 39 appropriately, the engagement of PTO clutch 18 and releasing of brake 30 can be synchronized to avoid engaging PTO clutch 18 without appropriately releasing brake 30.

Alternator 16 and transducer 26 are coupled to digital inputs of controller 20 by, respectively, electrical conductors 21,29 and conditioning circuits 79,38, which may be integral to controller 20. (In alternative embodiments in which signals regarding input shaft 19 are provided by transducer 24, an electrical conductor 25 along with conditioning circuit 38 may be employed.) Conditioning circuits 79,38 filter radio and other undesirable frequencies of interference from the signals produced by alternator 16 and transducer 26 (or, in alternate embodiments, transducer 24) and introduced in conductors 21,29 (or, in alternate embodiments, conductor 25). Additionally, conditioning circuits 79,38 place the signals produced by alternator 16 and transducer 26 (or transducer 24) within a 5 V range and provide these signals with a generally squarewave configuration which can be appropriately sampled by controller 20. Accordingly, the signals applied to controller 20 by alternator 16 (or transducer 24) and transducer 26 have a generally squarewave configuration with a frequency proportional to the rotational speed of input shaft 19 (or of engine 14) and output shaft 32, respectively.

Switches 22 and 27 each include an associated conditioning circuit 40 and 42, respectively, which may be integral to controller 20. Depending upon the application, circuits 40 and 42 may provide signal inversion and appropriate filtering to eliminate switch bounce. However, depending upon the type of controller 20 used, circuits 40 and 42 may be eliminated. The signals produced by switches 22 and 27 are applied to digital inputs of controller 20 via electrical conductors 23 and 31, respectively.

Hydraulic valves 28 and 34 are coupled to digital outputs of controller 20 by appropriate amplification and signal conditioning circuits 44 and 46, which may be integral to controller 20, and electrical conductors 48 and 50, respectively. As will be discussed in detail below, controller 20 applies an analog current signal to valve 28 via electrical conductor 48 and circuit 44, and applies a digital on/off signal to valve 34 via electrical conductor 50 and circuit 46. Due to the nature of the solenoids which operate valves 28 and 34, amplification and isolation circuits 44 and 46 are required to produce control signals having sufficient current and voltage to operate valves 28 and 34. Additionally, due to inductive kickbacks which may potentially be produced by the solenoids of valves 28 and 34, isolation may be required in circuits 44 and 46 to protect controller 20. While controller 20 is configured to apply an analog current signal to valve 28, in alternative embodiments an analog voltage signal, a pulse-width modulated (PWM) current signal or a PWM voltage signal may be provided instead to valve 28. In each case, the magnitude of the signal provided (which, in the case of a PWM current or voltage signal, is the time-average magnitude of the signal and therefore depends upon the duty cycle or pulse width of the signal) is proportional to the desired pressure from valve 28.

Turning to the operation of valve 28, valve 28 is a proportional hydraulic valve which applies hydraulic fluid to PTO clutch 18 from a system hydraulic fluid source 52 at a pressure which is related to (e.g., proportional to) the current applied to the solenoid associated with valve 28. Thus, the pressure of the fluid applied to PTO clutch 18 via hydraulic conduit 36 by valve 28 is controlled by applying a variable current signal to valve 28. In alternate embodiments, the pressure may be controlled by applying a variable voltage signal, a PWM current signal, or PWM voltage signal to valve 28. Where a PWM signal is applied to the solenoid of valve 28 to control the pressure of the hydraulic fluid applied to PTO clutch 18, the pressure of the fluid is proportional to the pulse width of the PWM signal produced by controller 20.

As discussed above, PTO clutch 18 is a multi-plate hydraulic clutch. This type of clutch is capable of transferring a torque from input shaft 19 to output shaft 32, where the torque is generally proportional to the pressure of the hydraulic fluid applied to PTO clutch 18. Output shaft 32 is shown directly coupled to 1000 RPM PTO (high speed PTO) 33 and also is shown coupled to 540 RPM PTO (low speed PTO) 35 by reduction gear 37. In alternative embodiments, high speed PTO 33 may be of another speed rating such as 750 RPM. Accordingly, the torque transferred between shafts 19 and 32 will be generally proportional to the magnitude of the analog current signal applied from controller 20 to the solenoid of valve 28. (In alternate embodiments where an analog voltage signal, a PWM current signal, or a PWM voltage signal is provided to valve 28, the torque transferred between shafts 19 and 32 also will be generally proportional to the magnitude of the applied signal, which in the case of a PWM signal is proportional to the duty cycle or pulse width of the signal.) Ideally, it may be convenient to have the torque transferred between shafts 19 and 32 exactly proportional to the magnitude of the current signal applied to valve 28; however, in mechanical systems, such a relationship may be difficult to obtain. Accordingly, controller 20 is programmed to compensate for the inability to obtain such proportionality, and overall non-linearity in the electronics and mechanism of the control system 10.

Also shown in FIG. 4 is an implement 17 that may be attached to (typically, towed by) tractor 12. Implement 17 includes equipment (not shown) that is operated by way of power from tractor 12. The equipment may perform one or more actions upon a field, such as planting or tilling. Implement 17 is capable of receiving power from tractor 12 via an implement input shaft 51 coupled to high speed PTO 33 via a coupler 47. When PTO clutch 18 is engaged and is transmitting power from engine 14 to output shaft 32 and high speed PTO 33, power is also then transmitted to implement input shaft 51. In addition to implement input shaft 51, implement 17 also include an implement output shaft 85 that couples, and transmits power from, the implement input shaft to the equipment. Implement input shaft 51 and implement output shaft 85 are coupled via an over-running clutch 87. Over-running clutch 87, as described above, allows implement output shaft 85 to continue to rotate freely even when implement input shaft 51 is not rotating, and allows the implement output shaft to rotate at a higher angular velocity than the implement input shaft. As described above, if locking pins and notches (not shown) of over-running clutch 87 are not engaged, implement input shaft 51 must rotate a portion of a rotation to engage the pins with the notches before the over-running clutch will transmit power from the input shaft to implement output shaft 85. Implement input shaft 51 is coupled to high speed PTO 33. In alternate embodiments, a similar implement input shaft may be coupled to low speed PTO 35 by way of a second coupler (not shown).

Figure 5:
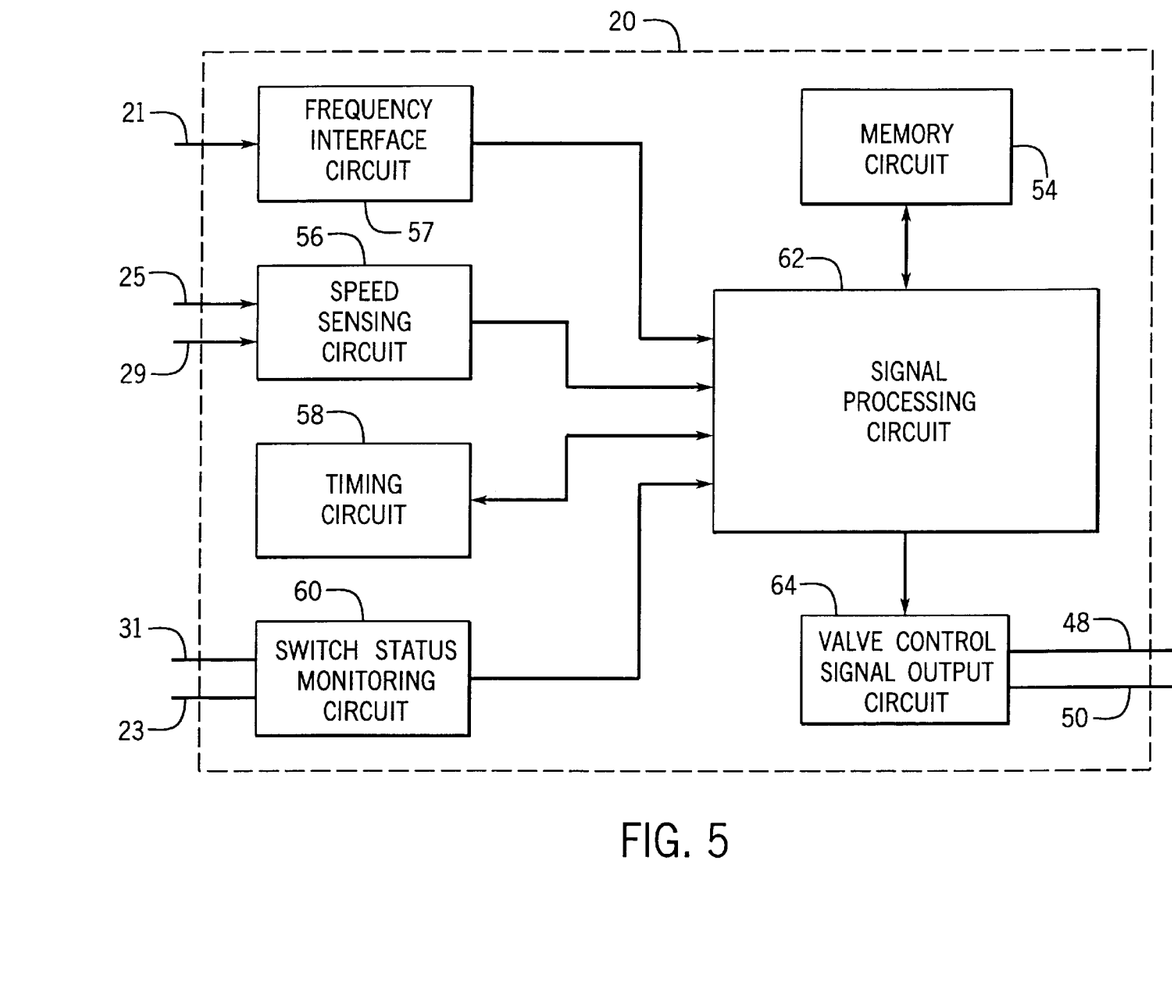
FIG. 5 is a schematic block diagram representative of the circuit configuration for the controller of the control system shown in FIG. 4.

Referring to FIG. 5, controller 20 includes a memory circuit 54 having RAM and ROM, and is configured (programmed) to provide the operations of a speed sensing circuit 56, a frequency interface circuit 57, a timing circuit 58, a switch status monitoring circuit 60, a signal processing circuit 62, and a valve control signal output circuit 64. The direction and channels for data flow between circuits 54, 56, 57, 58, 60, 62 and 64 are shown in FIG. 5. The ROM of memory circuit 54 stores those values required for initialization of control system 10, and the constants required for the operation of certain programs run by controller 20. The RAM of memory circuit 54 provides the temporary digital storage required for controller 20 to execute the control system program.

Frequency interface circuit 57 and speed sensing circuit 56 receive signals from alternator 16 and transducer 26 that are applied to conductors 21 and 29, and convert the signals to digital values representative of the rotational speeds of engine 14 (or input shaft 19) and output shaft 32, respectively. (In alternative embodiments, speed sensing circuit 56 may receive signals from transducer 24 that are applied to conductor 25, and convert those signals to digital values representative of the rotational speed of input shaft 19, in place of or in addition to frequency interface circuit 57, alternator 16 and conductor 21.) Insofar as the output of alternator 16 is a square-wave, frequency interface circuit 57 may operate as a timing interface that measures the time between pairs of edges of the square wave. Timing circuit 58 includes counters which are utilized by signal processing circuit 62 while executing the programming represented by the flow charts of FIGS. 6A and 6B. Switch status monitoring circuit 60 converts the signals applied by switches 22 and 27 to conductors 23 and 31 to digital values representative of the status of these switches. Valve control signal output circuit 64 produces an analog current signal applied to the solenoid of valve 28 via conductor 48 and circuit 44 having an appropriate magnitude, and produces the on/off signal applied to valve 34 via conductor 50 and circuit 46. As briefly discussed below, the program executed by controller 20 in the present embodiment is executed at 100 Hz (although, in alternate embodiments the program could be executed at other frequencies). (In an alternate embodiment in which valve 28 is provided with a PWM current or voltage signal, valve control signal output circuit 64 would produce a 400 Hz PWM current or voltage signal having an appropriate pulse width. Assuming the same program execution frequency of 100 Hz, the pulse width of the signal from circuit 64 would be updated every 10 milliseconds or every 4 cycles of the PWM signal.)

The operation of signal processing circuit 62 will now be described in detail in reference to FIGS. 6A, 6B, 7 and 8.

Figure 6A:
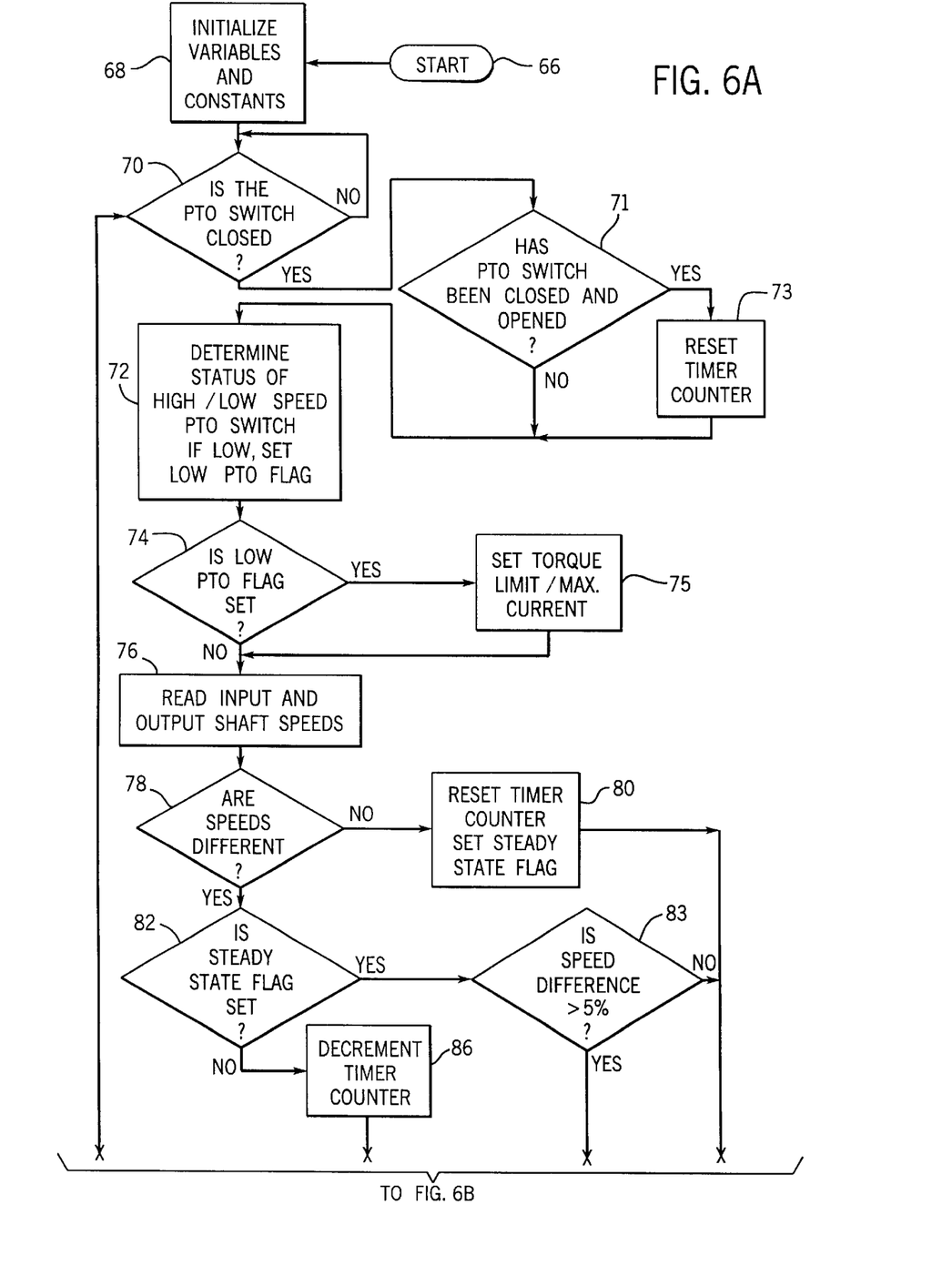
FIGS. 6A and 6B are flow charts representative of the control function of the control system of FIG. 4.
Figure 6B:
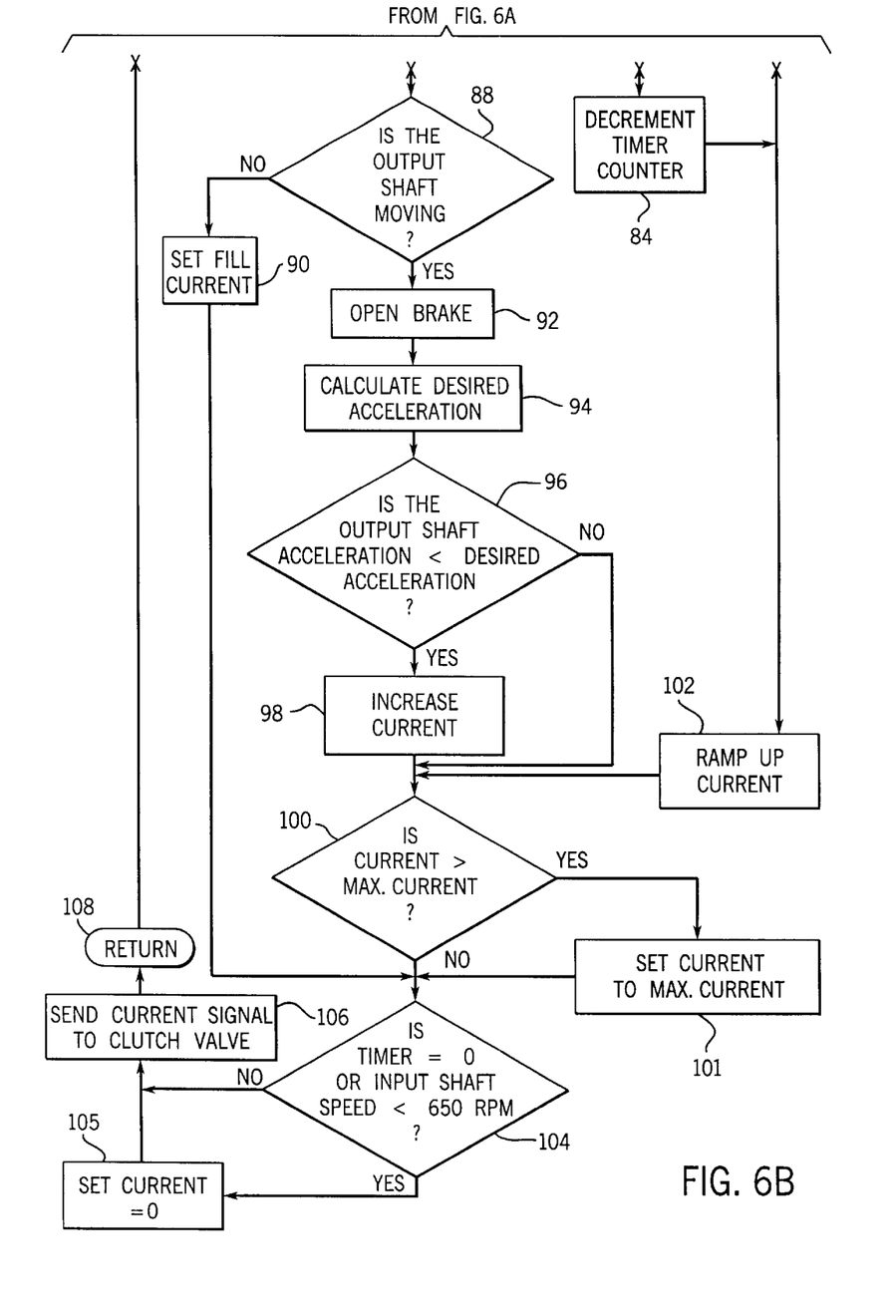

FIGS. 6A and 6B represent the operational steps of the program run by controller 20. Upon startup (step 66), controller 20 reads the ROM of memory circuit 54 and initializes the counter in timing circuit 58 to a number of counts representative of 6 seconds. In addition, controller 20 initializes those other variables and constants which may be utilized in the programming of controller 20 (step 68). In step 70, circuit 62 reads the digital value representative of the status of PTO on/off switch 22 from circuit 60, and returns if the switch has not been closed. If switch 22 is closed, after it was detected open, circuit 62 executes the steps required to begin engagement of output shaft 32 (and high speed and low speed PTOs 33 and 35).

In step 71, circuit 62 accesses circuit 60 to determine if switch 22 was opened and closed. If switch 22 was opened and closed, circuit 62 sets the counts in timing circuit 58 to a number representative of approximately 2 seconds (step 73) and then advances to step 72. If switch 22 was not opened and closed, circuit 62 advances immediately to step 72.

In step 72, circuit 62 reads the digital value representative of the status of switch 27 from circuit 60 and determines whether or not the PTO is operating as a high speed PTO or a low speed PTO. If switch 27 produces a signal representative of a low speed PTO, a LOW PTO flag is set. In step 74, circuit 62 determines whether the LOW PTO flag is set and, if so, circuit 62 calculates the torque limit for PTO clutch 18 at step 75 and stores a value in the RAM of circuit 54 representative of the maximum magnitude of the analog current signal (or, in alternate embodiments, the maximum magnitude of the analog voltage signal or maximum pulse width of the PWM current or voltage signal) to be applied to the solenoid of valve 28 during operation of low speed PTO 35. The maximum magnitude of the analog current signal depends upon the configuration of tractor 12, and is set so that the torque transferred by PTO clutch 18 is less than the maximum torque at which low speed PTO 35 will fail.

Since the reduction required to reduce the speed of low speed (540 RPM) PTO 35 to approximately 50% of the speed of high speed (1000 RPM) PTO 33 is approximately 2 to 1, a torque is applied to the low speed PTO that is approximately twice as large as the torque that is applied to the high speed PTO given a specific engine torque. Accordingly, the maximum pressure applied to PTO clutch 18 through valve 28 during operation of low speed PTO 35 to transmit a given torque to the low speed PTO is approximately 50% of the maximum pressure applied to the clutch through valve 28 during the operation of high speed PTO 33 to transmit the same torque to that PTO. This pressure is controlled by changing the magnitude of the analog current signal applied (or, in alternate embodiments, controlled by changing the magnitude of the analog voltage signal applied or the pulse width of the PWM signal applied). The maximum magnitude of the analog current signal (or, in alternate embodiments, the maximum magnitude of the analog voltage signal or the maximum pulse width of the PWM signal applied to valve 28) associated with low speed PTO 35 is stored in the ROM of circuit 54. At step 74, if circuit 62 determines that the LOW PTO flag is not set, circuit 62 will utilize the maximum current value stored in circuit 54 which is associated with the maximum torque PTO clutch 18 can transfer between input shaft 19 and low speed PTO 35 during operation of the low speed PTO, without causing failure of the low speed PTO due to torque overload.

In step 76, circuit 62 reads the digital values representative of the rotational speeds of input shaft 19 (or engine 14)

and output shaft 32 from circuits 57 and 56. In step 78, circuit 62 compares the speeds input shaft 19 (or engine 14) and output shaft 32. If the shaft speeds are the same, circuit 62 resets timing circuit 58 to a count representative of 2 seconds, and sets a STEADY STATE flag (step 80). Subsequently, circuit 62 loops to execute step 102 and the steps beginning at step 100. At step 102 the current magnitude value is increased by 1.00%. If the shaft speeds are different, processing continues at step 82.

In step 82, circuit 62 determines whether or not the STEADY STATE flag is set. If the STEADY STATE flag is set, circuit 62 determines if the speed difference between shafts 19 and 32 is greater than five percent (5%) (step 83). If the speed difference is greater than five percent, the time counter is decremented by 10 milliseconds (step 84), and circuit 62 jumps to the programming associated with steps 102 and then 100. If the speed difference is not greater than five percent, circuit 62 jumps immediately to the programming associated with steps 102 and then 100. If the STEADY STATE flag is not set, circuit 62 goes to step 86 wherein circuit 62 decrements the counter of circuit 58 by counts representative of 10 milliseconds. (The programming represented by the flow charts of FIGS. 6A and 6B runs at a rate of approximately 100 Hz. Accordingly, to decrement the timer counter in circuit 58, the counter must be decremented by the number of counts associated with 10 milliseconds.)

In step 88, circuit 62 reads the value representative of the rotational speed of output shaft 32 to determine whether or not shaft 32 is moving. If shaft 32 is moving, circuit 62 applies a digital signal to circuit 64, where circuit 64 responds to the signal by applying a signal to conductor 50 which causes valve 34 to release brake 30 (step 92). At step 90, if shaft 32 is not moving, circuit 62 reads the time from timer circuit 58 associated with the times since PTO on/off switch 22 was closed and sets the current magnitude value to a predetermined percentage (e.g. 20%) of the maximum current magnitude value either set at step 75 in the case of operation of low speed PTO 35 (at 540 RPM ), or read from circuit 54 in the case of operation of high speed PTO 33 (at 1000 RPM), if switch 22 has been closed for 300 milliseconds or less. If the time is greater than 300 milliseconds, the current magnitude value is increased by 0.1% for each 10 millisecond increment of time elapsed subsequent to switch 22 being closed for 300 milliseconds. After setting the current magnitude value at step 90, circuit 62 jumps to step 104.

In general, steps 88 and 90 are provied produce smooth engagement of PTO clutch 18. More specifically, before the plates of PTO clutch 18 engage, a certain volume of hydraulic fluid must be provided to PTO clutch 18 before the clutch plates of PTO clutch 18 travel through the distance required to engage the clutch plates. During this clutch filling process, it is undesirable to apply hydraulic fluid to the clutch at a fixed or undesirably high pressure since the clutch will abruptly apply torque from shaft 19 to shaft 32. Such an abrupt application of torque can potentially cause damage to output shaft 32 or an associated implement connected to the output shaft. By initiating the filling of PTO clutch 18 with a pressure equivalent to the pre-stress force applied by the clutch springs, the clutch plates move relatively slowly toward engagement, and the pressure is increased gradually until engagement. This process prevents the abrupt transfer of torque from shaft 19 to shaft 32.

In step 94, circuit 62 calculates a desired acceleration by dividing the speed at shaft 19 by 2 seconds. In general, step 94 is the start of the process for controlling PTO clutch 18 to accelerate output shaft 32 relative to shaft 19 until the speed of shaft 32 reaches its steady state speed (no slip with respect to PTO clutch 18) which equals or is proportional to the speed of shaft 19. The desired acceleration of shaft 32 in step 94 is calculated based upon 2 seconds, which was selected based upon experimentation to provide optimum acceleration of shaft 32. However, depending upon the system configuration, this time period may be varied according to the particular tractor and PTO application. The calculated acceleration serves as a reference for accelerating shaft 32 relative to shaft 19 in step 96.

As described above, the prior art PTO clutch control system only calculates the desired acceleration once, just as the PTO engagement process is beginning. In contrast, in the present embodiment of the invention, the PTO clutch control system repeatedly calculates the desired acceleration. As shown in FIGS. 6A and 6B, the control system program repeatedly cycles through step 94 once PTO on/off switch 22 has been closed (in step 70) and so long as the speeds of input shaft 19 and output shaft 32 are different (as determined in step 78), the STEADY STATE flag is not set (as determined in step 82), and the output shaft is moving (as determined in step 88). In the present embodiment (unlike the prior art), the desired acceleration is recalculated each time the PTO clutch control system cycles through step 94 (instead of only the first time). The desired acceleration is repeatedly calculated by dividing the current speed of shaft 19, or another quantity related to engine speed, by the desired time of engagement, which is 2 seconds in the present embodiment. Although in alternate embodiments the frequency of recalculation may vary (or the recalculation may occur at a frequency less than the frequency at which the control system program cycles through step 94), in the present embodiment the desired acceleration is recalculated at the same frequency as the control system program cycles through step 94, which (as stated above) is approximately 10 milliseconds. Therefore, the recalculation occurs with sufficient rapidity that the desired acceleration is effectively continuously recalculated to reflect changes in the speed of input shaft 19 (that is, changes in engine speed).

Figure 7:
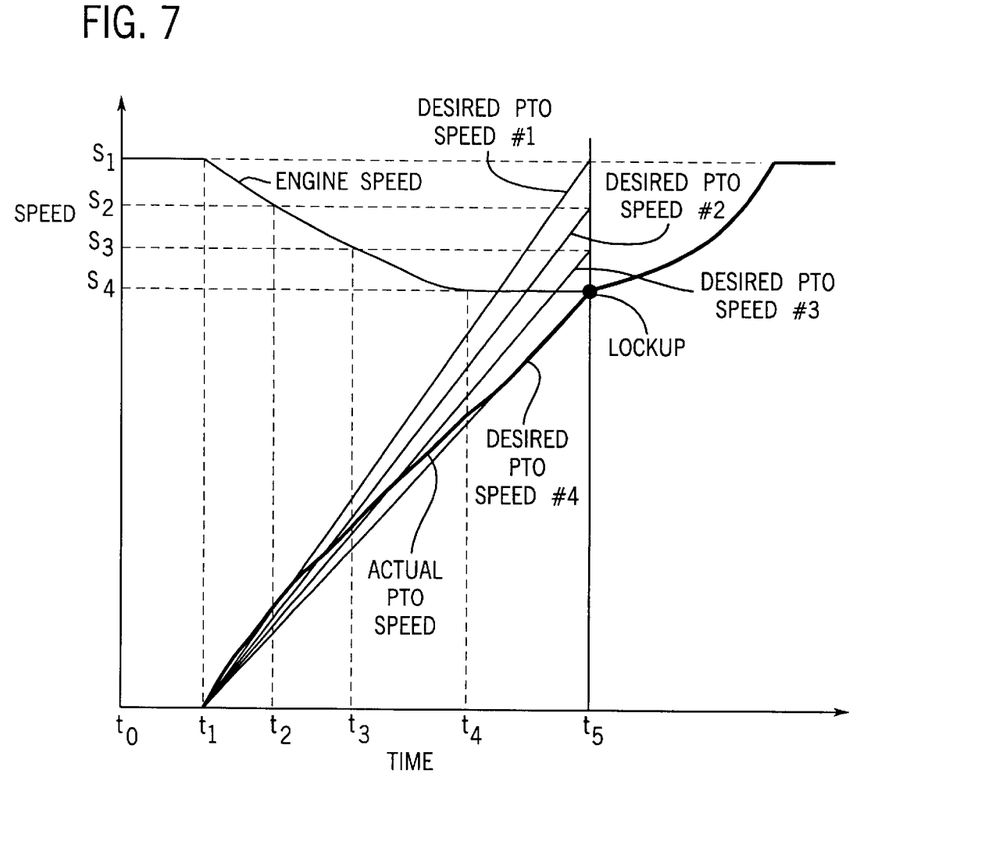
FIG. 7 is a graphical representation of the actual and desired speeds of a PTO and engine speed of an agricultural vehicle during engagement of the PTO.

Referring to FIG. 7, examples of the desired and actual speeds for output shaft 32 (i.e., PTO speed), and engine speed (i.e., the speed of input shaft 19), as measured or determined by the PTO clutch control system of the present embodiment, are plotted against time. Four desired speed curves are shown. The four speed curves are determined based upon the engine speed (or speed of input shaft 19) as measured at four times, $t_1$, $t_2$, $t_3$ and $t_4$ and are labeled as, and referred to below as, respectively, the "desired PTO speed #1", "desired PTO speed #2", "desired PTO speed #3" and "desired PTO speed #4" curves. For convenience, only four desired speed curves are shown in FIG. 7. As discussed above, the desired accelerations in the present embodiment are actually recalculated approximately every 10 milliseconds (effectively continuously), and so FIG. 7 is meant to be a symbolic description of the actual operation of the PTO clutch control system, in which there are many more than four desired speed curves. Also, it is for generality that the four desired speed curves are shown as being calculated at four times (times $t_1$–$t_4$ that are not equidistant from one another. Although alternative embodiments may vary, in the present embodiment, the desired accelerations (in contrast to FIG. 7) are recalculated at a constant frequency as the PTO clutch control system repeatedly cycles through step 94.

As shown in FIG. 7, output shaft 32 begins to rotate at time $t_1$, and the speed of the output shaft equals the speed of input shaft 19 (or the engine speed) at time $t_5$ (lock-up). Also as shown, the speed of input shaft 19 (and that of the engine) does not remain constant as power begins to be transferred to output shaft 32 but instead decreases or droops. Consequently if the actual speed of output shaft 32 were to increase in accordance with the desired PTO speed #1 curve, which is determined based upon the initial engine speed at time $t_1$, the shaft would attain the speed of input shaft 19 (i.e., the engine speed) in a time significantly shorter than the desired time of engagement (the time interval between times $t_5$ and $t_1$, i.e., 2 seconds). Instead of attaining the speed of input shaft 19 at time $t_5$, the shaft would attain the speed of the input shaft at the time at which, as shown in FIG. 7, the desired PTO speed #1 curve crosses the engine speed curve.

The present embodiment of the invention avoids this excessive engagement rate by adjusting the desired speed curve as engine speed decreases. As shown in FIG. 7, at times $t_2$, $t_3$ and t4, the desired acceleration is recalculated (i.e., at step 94 of the control system program) and the desired speed curve changes, respectively, to the desired PTO speed #2, desired PTO speed #3 and desired PTO speed #4 curves. As described below, in the present embodiment the actual acceleration of output shaft 32 is adjusted as the desired speed curve changes (more specifically, the actual acceleration is adjusted based upon the difference between the actual and desired accelerations). Insofar as the actual acceleration of output shaft 32 is adjusted to reflect the new desired speed curves, the output shaft speed increases at a rate such that it will approach the speed of input shaft 19 (i.e., the engine speed) at approximately $t_5$ (i.e., within the desired time of engagement, 2 seconds), as shown in FIG. 7, and not substantially before $t_5$.

Turning to step 96, the actual acceleration of output shaft 32 is calculated by reading the current speed of the output shaft from circuit 56, and the speed of the output shaft monitored during the previous loop through steps 70–108. Steps 70–108 are executed every 10 milliseconds; thus, the output shaft acceleration is the change in output shaft speed between program loops divided by 10 milliseconds. Once the actual acceleration of output shaft 32 is calculated in step 96, it may be compared with the desired acceleration calculated in step 94. If the actual acceleration of output shaft 32 is greater than or equal to the desired acceleration, the current magnitude value is not changed (the program proceeds from step 96 to step 100). In certain systems, it may be desirable to reduce the current magnitude value when the actual acceleration of output shaft 32 is greater than the desired acceleration. However, this type of control may cause hunting, and thus, an acceleration of output shaft 32 which is not smooth. Accordingly, in the presently preferred embodiment of control system 10, the current magnitude value is not modified when the actual acceleration of output shaft 32 exceeds the desired acceleration.

However, if the actual acceleration of output shaft 32 is less than the desired shaft acceleration, the present current magnitude is increased, in step 98. The manner in which current magnitude changes may vary for different control systems. As stated above, a first control system would increase, at step 98, the current magnitude by 0.1% if the desired acceleration exceeds the actual acceleration (the "unmodified PTO clutch control system"). A second control system would employ a proportional (more accurately, pseudo-proportional) adjustment algorithm (the "modified PTO clutch control system") in which: if the actual acceleration of the PTO is less than the desired acceleration but greater than two-thirds of the desired acceleration, the control system increases the torque transmitted by the PTO clutch at a slow rate; if the actual acceleration is less than two-thirds of the desired acceleration but greater than one-third of the desired acceleration, the control system increases the torque transmitted at a medium rate; and if the actual acceleration is less than one-third of the desired acceleration, the control system increases the torque transmitted at a fast rate. However, while either of these control systems (or the programming contained therein) may be employed in conjunction with the control system described above in which the desired accelerations are repeatedly recalculated (i.e., such that the desired speed curve changes with engine speed), in the present embodiment of the invention a third system is employed.

Figure 8:
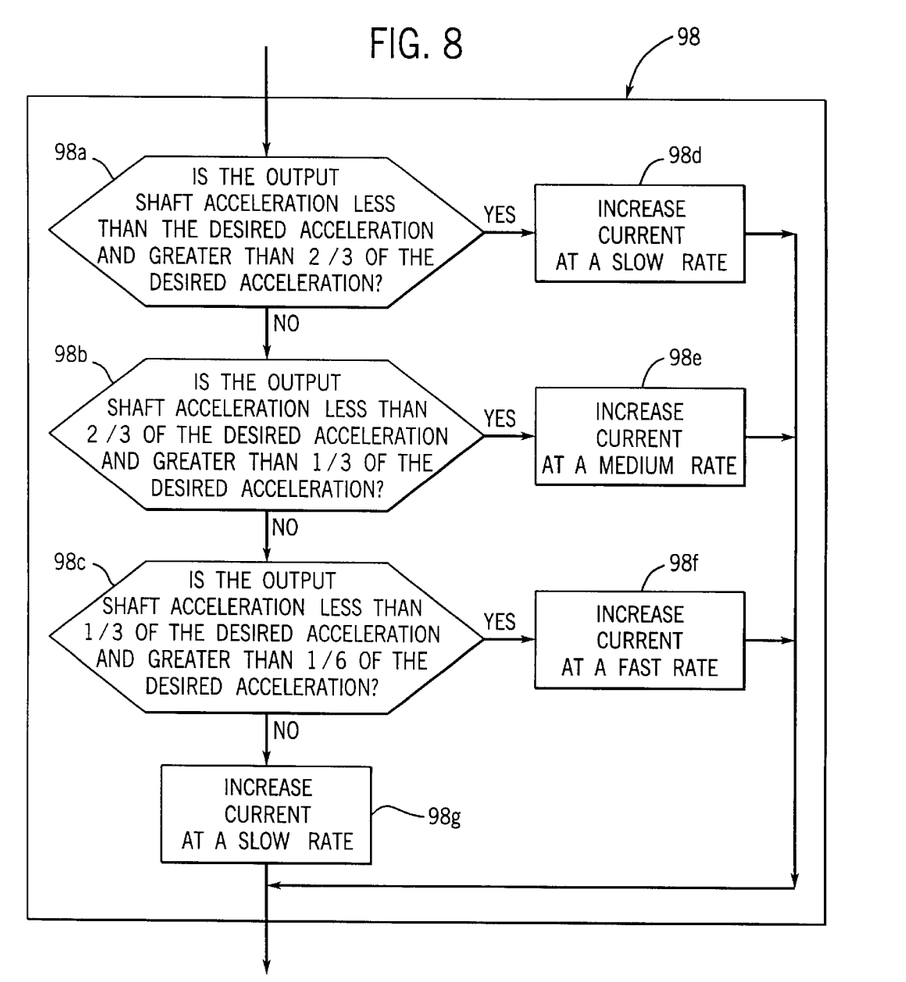
FIG. 8 is a section of a flow chart representative of one embodiment of the functionality of step 98 of the flow chart of FIG. 6B.

Referring to FIG. 8, step 98 (of the program shown in FIGS. 6A and 6B) is shown to constitute a modified proportional adjustment algorithm. In step 98a, the program determines whether the actual acceleration is between the desired acceleration and two-thirds of the desired acceleration. If so, the program increases the current magnitude at a slow rate in step 98d. If not, the program proceeds to step 98b, in which the program determines whether the actual acceleration is between two-thirds of the desired acceleration and one-third of the desired acceleration. If so, the program increases the current magnitude at a medium rate in step 98e. If not, the program proceeds to step 98c, in which the program determines whether the actual acceleration is between one-third of the desired acceleration and one-sixth of the desired acceleration. If so, the program increases the current magnitude at a fast rate in step 98f. If not, the actual acceleration is between zero and one-sixth of the desired acceleration, and the program proceeds to step 98g in which the current magnitude is increased at a slow rate. (It should be noted that the program may be designed to treat actual accelerations that exactly equal two-thirds, one-third or one-sixth of the desired acceleration as if the actual accelerations were above or below these levels.)

A significant characteristic of this modified proportional adjustment algorithm is that the modified proportional adjustment algorithm (a) determines whether the actual acceleration is below a minimum threshold proportion of the desired acceleration, and (b) increases the current magnitude at a slow rate if the actual acceleration is below the minimum threshold proportion even though the actual acceleration is significantly less than the desired acceleration. That is, in the present embodiment, the modified proportional adjustment algorithm determines in step 98c whether the actual acceleration is below one-sixth of the desired acceleration and, if so, increases the current magnitude at a slow rate in step 98g.

This feature of the modified proportional adjustment algorithm alleviates the problems described above that are associated with the possible spurious rotation of output shaft 32 due to premature delivery of torque by PTO clutch 18 (before the clutch is fully engaged) that may occur, for example, before over-running clutch 87 is locked. This is because typically, once PTO clutch 18 is engaged and output shaft 32 is being accelerated, the output shaft would not have an actual acceleration less than one-sixth of the desired acceleration. Further, typically, PTO clutch 18 is not capable of delivering sufficient torque when the clutch is not fully engaged as to cause output shaft 32 to accelerate at a rate greater than one-sixth of any of the desired accelerations that may be calculated by control system 10. Therefore, the modified proportional adjustment algorithm fulfills the two goals of (a) causing the current magnitude to increase at a fast rate when the actual acceleration of output shaft 32 is significantly less than the desired acceleration and yet (b) not causing the current magnitude to increase at a fast rate when PTO clutch 18 is still not fully engaged.

While in the present embodiment, the ratios of actual acceleration to desired acceleration that determine the current magnitude increase rates are set at two-thirds, one-third and one-sixth, in alternate embodiments these ratios may be set at different levels. Indeed, different PTO clutch control systems may have a variety of different proportional adjustment algorithms that distinguish among more (or less) than four ranges (of ratios of actual acceleration to desired acceleration) and in which the control systems provide finer (or less fine) gradations of increases in the current magnitude. (Fully proportional control may also be appropriate in certain embodiments.) Also, the exact values for the "slow", "medium" and "fast" rates of current increase may vary depending upon the embodiment, although the "fast" rate of increase will typically be the fastest rate at which the mechanical clutch can predictably increase torque in response to commands from the control system to increase pressure. It should be noted that, while the present embodiment of the invention combines both the functionality of this modified proportional adjustment algorithm and the above-described repeated (continuous) recalculation of the desired acceleration (and modification of the desired speed curve), the modified proportional adjustment algorithm of step 98 may be employed even when the desired acceleration is only calculated once.

At time $t_5$, the speeds of input shaft 19 (or engine 14) and output shaft 32 are equal or proportional, and circuit 62 executes steps 100, 101 and 102 to ramp up the current signal to produce a clutch pressure in PTO clutch 18 associated with the maximum torque to be transmitted between input and output shaft 19, 32. In step 100, the current signal is compared with the maximum current value set and determined at step 75 in case of operation at low speed (540 RPM), and the maximum current value stored in circuit 54 in case of operation at high speed (1000 RPM). If the present current value set at step 98 or step 102 is greater than the maximum current value, the current value is set to the maximum current value (step 101).

In step 104, circuit 62 checks the count of the timer in circuit 58 to 30 determine whether or not the timer has timed out. If the timer equals 0, then either motion of output shaft 32 did not occur within 6 seconds (timer count at initialization), or the speed difference between shafts input and output shafts 19, 32 subsequent to time $t_5$ (lock-up) has been greater than 5% for more than 2 seconds which indicates undesirable slippage in PTO clutch 18. In step 104, circuit 62 also determines if the speed of input shaft 19 has gone below 500 RPM. If either the timer count has reached 0 or the speed of input shaft 19 has gone below 500 RPM, circuit 62 sets the current magnitude to zero (step 105). In step 106, circuit 62 applies the present current magnitude value to circuit 64. In response, circuit 64 applies an analog current signal to valve 28 via conductor 48 at a frequency of 400 Hz with a magnitude corresponding to the present current magnitude value which will be updated upon the next execution of steps 70 through 106. In step 108, circuit 62 returns to the execution of step 70.

In alternate embodiments in which a voltage or PWM current or voltage signal is applied to valve 28, a similar routine would be employed in which the voltage magnitude or pulse width (of a PWM signal) is increased or otherwise controlled in place of current magnitude, in order to respond to the difference between the desired and actual accelerations, to limit the maximum value of the 15 voltage magnitude or pulse width of the signal applied, and to perform the other operations described above.

Although only a few exemplary embodiments of this invention have been described above, those skilled in the art will readily appreciate that many modifications are possible in the exemplary embodiments without materially departing from the novel teachings and advantages of this invention. For example, developments in PTO clutches may make electric clutches cost effective for PTO applications. Accordingly, hydraulic PTO clutch 18 and control valve 28 may potentially be replaced with an associated electric clutch and electric clutch control circuit. As is readily indicated, the invention can be employed in a variety of work vehicles that employ PTOs that must be engaged and disengaged. Further, the number and types of control elements and sensor elements may vary insofar as they continue to accomplish similar functions related to the engagement of PTOs. Accordingly, all such modifications are intended to be included within the scope of the invention as defined in the following claims. Other substitutions, modifications, changes and omissions may be made in the design, operating conditions and arrangement of preferred and alternative embodiments without departing from the spirit of the invention as expressed in the appended claims.

What is claimed is:

1. In a vehicle having a power source for producing rotational motion, an apparatus for controlling engagement of a power take-off shaft (PTO) for supplying rotational motion to a piece of equipment other than the vehicle, the apparatus comprising:

a clutch including an input shaft coupled to the power source and an output shaft coupled to the PTO, the clutch including a plurality of plates operable to translate through a distance during engagement of the clutch and, upon engagement of the clutch, controllably transmitting torque between the input and output shafts;

an input speed sensor for sensing a quantity related to the angular velocity of the input shaft and providing an input speed signal representative thereof;

an output shaft speed sensor for sensing angular velocity of the output shaft and providing an output shaft speed signal representative thereof;

an electromechanical clutch controller coupled to the clutch for adjusting pressure of a hydraulic fluid applied to the clutch in response to control signals during engagement of the PTO, wherein torque transmitted between the input and output shafts is responsive to the control signals; and a control circuit coupled to the input and the output shaft speed sensors and the clutch controller, the control circuit configured to receive the input and the output shaft speed signals and to provide the control signals in response thereto, and wherein, during engagement of the PTO, the control circuit continuously determines a desired acceleration of the PTO based upon the input speed signal and continuously determines an actual acceleration of the PTO shaft based upon the sensed angular velocity of the output shaft, and the control circuit generates the control signals using the desired and actual accelerations, wherein the control circuit provides control signals to cause the torque transmitted through the clutch to increase at a rate depending upon the difference between the desired and actual accelerations when the actual acceleration is more than a threshold proportion of the desired acceleration, and to cause the torque to increase at a rate independent of the difference when actual acceleration is less than the threshold proportion of the desired acceleration.

2. The apparatus of claim 1, wherein the control circuit generates the control signals so that the angular velocity of the output shaft increases to equal the angular velocity of the input shaft within a particular time period.

3. The apparatus of claim 1, wherein the threshold proportion at a given time is one-sixth of the desired acceleration at that time, and wherein the control signal provided by the control circuit when the actual acceleration is less than the threshold proportion is a slow increase control signal.

4. The apparatus of claim 3, wherein the control signals provided by the control circuit when the actual acceleration is more than the threshold proportion of the desired acceleration include a slow increase control signal, a medium increase control signal and a fast increase control signal, wherein the control circuit provides the slow increase control signal if the actual acceleration is less than the desired acceleration and more than two-thirds of the desired acceleration, wherein the control circuit provides the medium increase control signal if the actual acceleration is less than two-thirds of the desired acceleration and more than one-third of the desired acceleration, and wherein the control circuit provides the fast increase control signal if the actual acceleration is less than one-third of the desired acceleration and more than the threshold proportion.

5. In a vehicle having a power source for producing rotational motion, an apparatus for controlling engagement of a power take-off shaft (PTO) for supplying rotational motion to a piece of equipment other than the vehicle, the apparatus comprising:

a clutch including an input shaft coupled to the power source and an output shaft coupled to the PTO, the clutch including a plurality of plates operable to translate through a distance during engagement of the clutch and, upon engagement of the clutch, controllably transmitting torque between the input and output shafts;

an input speed sensor for sensing a quantity related to the angular velocity of the input shaft and providing an input speed signal representative thereof;

an output shaft speed sensor for sensing angular velocity of the output shaft and providing an output shaft speed signal representative thereof;

an electromechanical clutch controller coupled to the clutch for adjusting pressure of a hydraulic fluid applied to the clutch in response to control signals during engagement of the PTO, wherein torque transmitted between the input and output shafts is responsive to the control signals; and a control circuit coupled to the input and the output shaft speed sensors and the clutch controller, the control circuit configured to receive the input and the output shaft speed signals and to provide the control signals in response thereto, and wherein, during engagement of the PTO, the control circuit continuously determines an actual acceleration of the PTO based upon the sensed angular velocity of the output shaft, and the control circuit generates the control signals using a desired acceleration and the actual acceleration, wherein the control circuit provides control signals to cause the torque transmitted through the clutch to increase at a rate depending upon the difference between the desired and actual accelerations when the actual acceleration is more than a threshold proportion of the desired acceleration, and to cause the torque to increase at a rate independent of the difference when the actual acceleration is less than the threshold proportion of the desired acceleration.

6. The apparatus of claim 5, wherein the threshold proportion at a given time is one-sixth of the desired acceleration at that time, and wherein the control signal provided by the control circuit when the actual acceleration is less than the threshold proportion is a slow increase control signal.

7. The apparatus of claim 6, wherein the control signals provided by the control circuit when the actual acceleration is more than the threshold proportion of the desired acceleration include a slow increase control signal, a medium increase control signal and a fast increase control signal, wherein the control circuit provides the slow increase control signal if the actual acceleration is less than the desired acceleration and more than two-thirds of the desired acceleration, wherein the control circuit provides the medium increase control signal if the actual acceleration is less than two-thirds of the desired acceleration and more than one-third of the desired acceleration, and wherein the control circuit provides the fast increase control signal if the actual acceleration is less than one-third of the desired acceleration and more than the threshold proportion.

8. In a vehicle having a power source for producing rotational motion, an apparatus for controlling engagement of a power take-off shaft (PTO) for supplying rotational motion to a piece of equipment other than the vehicle, the apparatus comprising:

a clutch including an input shaft coupled to the power source and an output shaft coupled to the PTO, the clutch including a plurality of plates operable to translate through a distance during engagement of the clutch and, upon engagement of the clutch, controllably transmitting torque between the input and output shafts;

an input speed sensing means for sensing a quantity related to the angular velocity of the input shaft and providing an input speed signal representative thereof;

an output speed sensing means for sensing a quantity related to the angular velocity of the output shaft and providing an output speed signal representative thereof;

a clutch control means coupled to the clutch for adjusting operation of the clutch in response to control signals during engagement of the PTO, wherein torque transmitted between the input and output shafts is responsive to the control signals; and a speed control means coupled to the input and the output speed sensing means and the clutch control means, the speed control means for receiving the input and the output speed signals, for continuously determining an actual acceleration of the PTO based upon the output speed signal for generating the control signals using a desired acceleration based upon the input speed sign and the actual acceleration, and for providing the control signals to the clutch control means in response thereto, wherein the speed control means provides the control signals to cause the torque transmitted through the clutch to change at a fast rate when the difference between the desired and actual accelerations is large except when the difference between the desired and actual accelerations indicates that the clutch is not yet engaged.

9. In a vehicle having a power source for producing rotational motion, a method of controlling engagement of a power take-off shaft (PTO) for supplying rotational motion to a piece of equipment other than the vehicle, the method comprising the steps of:

sensing a quantity related to the angular velocity of an input shaft of a clutch at an input speed sensor;

sensing angular velocity of an output shaft of the clutch at an output shaft speed sensor;

providing an input speed signal representative of the sensed quantity related to the angular velocity of the input shaft;

providing an output shaft speed signal representative of the sensed angular velocity of the output shaft;

receiving the input and the output shaft speed signals at a control circuit;

determining a desired acceleration of the PTO based upon the input speed signal;

continuously determining an actual acceleration of the PTO based upon the output shaft speed signal;

generating control signals based upon the desired and actual accelerations that, when the clutch is engaged, cause the torque transmitted through the clutch to increase at a rate depending upon the difference between the desired and actual accelerations when the actual acceleration is more than a threshold proportion of the desired acceleration, and cause the torque to increase at a rate independent of the difference when the actual acceleration is less than the threshold proportion of the desired acceleration; and adjusting operation of the clutch in response to the control signals during engagement of the PTO, wherein torque is controllably transmitted between the input and output shafts when the clutch is engaged.

* * * * *